March 5, 1946.  C. R. YANCEY  2,396,221
BUSINESS FORM
Filed Nov. 13, 1943  4 Sheets-Sheet 1

INVENTOR.
CHARLES R. YANCEY
BY
ATTORNEY

March 5, 1946.  C. R. YANCEY  2,396,221
BUSINESS FORM
Filed Nov. 13, 1943  4 Sheets-Sheet 2

INVENTOR.
CHARLES R. YANCEY
BY
ATTORNEY

March 5, 1946.  C. R. YANCEY  2,396,221
BUSINESS FORM
Filed Nov. 13, 1943  4 Sheets-Sheet 3

Fig. 9
Fig. 10

INVENTOR.
CHARLES R. YANCEY
BY
ATTORNEY

March 5, 1946.   C. R. YANCEY   2,396,221
BUSINESS FORM
Filed Nov. 13, 1943   4 Sheets-Sheet 4

INVENTOR.
CHARLES R. YANCEY
BY
ATTORNEY

Patented Mar. 5, 1946

2,396,221

UNITED STATES PATENT OFFICE 2,396,221

BUSINESS FORM

Charles R. Yancey, Dallas, Tex.

Application November 13, 1943, Serial No. 510,213

25 Claims. (Cl. 283—1)

This invention relates to new and useful improvements in business forms used for the issuance of periodic statements of accounts or bills and for the identification and processing of remittances received thereon.

The present practice employs a single sheet statement which bears a heading carrying the name and address of the store or creditor and of the customer or debtor. Frequently the heading also shows dates and code numbers or other symbols for identification purposes. The statement usually bears a request that such heading, or credit stub, be detached from the statement body and returned with the remittance so as to provide a ready identification of the payment. The said credit stub is also used as a voucher slip for posting the credit to the account.

Unfortunately, a great many customers fail to return the statement heading with the remittance, thus making identification of the payments difficult, if not impossible. In such cases, the scrawled signature on the check is often the only clue as to the account, which itself may be under another name.

Under modern machine methods of bookkeeping such statements are prepared by posting on the bodies thereof the charges and credits as they occur during the period covered. Usually, a duplicate impression is made on a permanent cumulative ledger sheet by carbon process or otherwise, at the time the entries are made on the statement. Frequently, a journal copy is made at the same time. The several sheets described are customarily maintained in vertical position in a tray or in a book which is designed so that the sheets may be easily removed for inspection or for speedy insertion into a bookkeeping machine as postings may be necessary during the accounting period. The single sheet statement is ordinarily the first of the sheets in the group described.

At the conclusion of the accounting period the statement which, as stated, bears the name of the customer or debtor on the heading, is readily folded and inserted into a window envelope. Thus, both for the constant reference required during the accounting period and for efficient mailing procedure, it is important that in any improved form the name of the customer or debtor be left in its present position, i. e., at the top of the statement.

As stated, the failure of customer or debtors to return the heading or credit stub causes much difficulty in identification of the payment. The present practice, however, is beset with other difficulties. Payments are received in envelopes of all sizes and shapes, the opening of which is tedious because of: (a) the necessity of sorting as to size, shape, and apparent contents, (b) the necessity for "knocking-down" contents by striking an edge of the envelope so as to move contents away from the edge to be cut or opened and thus to prevent damage to checks or other enclosures, and (c) the necessity for extra care to avoid leaving contents in envelopes. When a customer fails to return the heading or credit stub, the check is ordinarily pinned or otherwise affixed to the envelope or some other paper so that efforts may be made to identify the payment. Experience discloses that clerical costs are materially increased by the tedious identification processes necessary when customers fail to return the statement heading or credit stub. Even if the heading is returned by the customer it is still usually necessary to affix the check to such heading for further auditing and crediting to proper account. In so affixing the papers, pertinent details on one or the other are frequently obscured.

It is therefore a principal object of this invention to provide an improved combination statement, blank check, and return envelope form which is so devised as to offer such conveniences to the customer as to induce him to use the forms furnished, and thus return the statement heading or credit stub with the remittance.

It is an important object of this invention to provide an improved combination business form of the character described which will facilitate the work of the creditor in processing mailed remittances by (a) making easier the sorting of remittances, (b) enabling a faster and damage-proof opening of same, (c) assuring ready identification of the remittances, and (d) expediting the crediting of the remittances to the debtor's account.

Another object is to provide a combination form of the character described which has no lateral flaps, extensions, indentations, or excess thickness and is thus adapted for use with creditor's existing bookkeeping machines, other office devices, and filing equipment or any he is likely to install.

An additional object is to provide a combination form of the character described which will require only one imprinting of the customer's name, and may be easily folded and inserted in a window envelope, and which will not interfere with the present methods of making carbon copies.

It is also an object of the invention to provide a combination form of the character described which has located thereon adhesive areas positioned for closure of portions of the form to produce a sealed return envelope having incorporated therein a remittance check.

A further object is to provide a combination form of the character described which is so arranged that the adhesive surfaces thereon are covered or protected until deliberately exposed for use.

Still another object is to provide a combination form of the character described wherein portions of the form may be used to produce a return envelope sufficiently opaque to obscure the matter therein, said envelope having adequate substance and stiffness to withstand handling and meet postal requirements.

It is another object to provide such a combination form which may be easily and quickly manufactured, if desired, from a continuous roll of paper on high speed rotary perforating, printing, and gluing machinery.

A further object is to provide a combination form of the character described which is readily adapted to use in accounting preparation processes either in single or multiple sheets or in continuous rolls for transverse, lateral or longitudinal feed into and ejection out of various types of accounting machines and other office devices.

Another object is to encourage prompt payments by providing customers or other debtors with the blank check and addressed return envelope along with the statement, thus removing a frequent cause of delayed payments due to unavailability of a blank check or envelope, and to do so without the added labor costs incident to inserting additional separate or attached blank checks and envelopes in outgoing statements.

Still another object of this combination business form of this invention is to provide a convenient device for recording the postmark showing the date the customer or other debtor mailed the remittance in order to determine any question as to the date of such payment, which might arise with respect to compliance with any policy of the creditor, present or future Government credit regulations, or the like, and to accomplish this object without materially increasing the filing material or space required on the part of the creditor for such permanent record.

Another object is to provide in a combination business form of the character described a statement which is readily and interchangeably adapted to itemized billing as well as to simplified billing, whereby the user may show all details of transactions during the accounting period involved, or may show only the outstanding balance of the particular account rendered at the end of such period.

Additional objects and advantages of the invention will be apparent from the following description of a combination statement, blank check, and return envelope form manufactured in accordance with the invention, and by reference to the accompanying drawings which illustrate preferred embodiments of the same, wherein:

In the drawings, the numeral 10 designates a rectangular sheet of paper or other suitable material which is printed substantially as shown, then is perforated, folded, glued and cut, as shown and hereafter more fully described, to provide an improved combined statement, blank check, and return envelope form, or business form.

Figure 1:
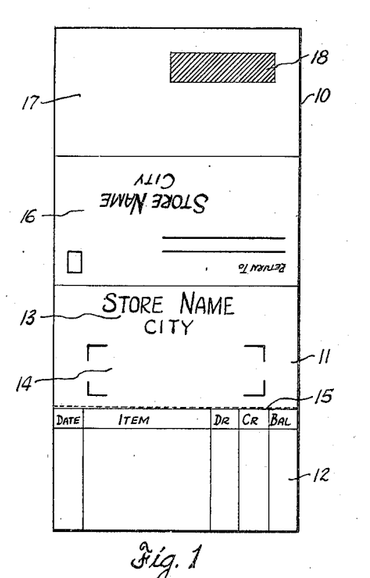
Figure 1 is a plan view of one side of a business form made in accordance with the invention.

As shown in Figure 1, the sheet of paper 10 has imprinted on one side thereof a statement body 12 at one end of said sheet, and a statement heading 11 superjacent to said statement body, in the customary format. The heading 11 bears the name and address of the store or creditor at 13 and provides space at 14 for insertion of the name and address of the customer or debtor by addressing machine or the like. It is to be noted that the single impression of debtor's name required by this form is made to serve several purposes as will be more fully explained. The statement body 12 has the usual accounting form printed or otherwise inscribed thereon, which may be arranged in any manner suitable to the practices of the user, but, as shown, includes date, item, debit, credit and balance column headings. The statement body 12 may be any customary or desired length to meet the requirements of the particular user or store.

Sheet 10 is perforated along a transverse line 15 between the statement head and body panels so that the body may be detached from the heading for purposes which will be hereinafter more fully explained. The transverse perforated line 15 also serves as a ready guide for and facilitates folding of the statement for insertion into an ordinary window envelope for mailing purposes.

A return address panel 16, imprinted with the name and address of the store or creditor is positioned superjacent to the heading 11 with its printing preferably in inverted position with relation to the printing of the heading. This return address panel ultimately becomes part of a self-addressed return envelope. The return address panel 16 should be of substantially the same length as the statement heading panel 11. Another panel or section 17 is provided at the other end of sheet 10 superjacent to the return address panel.

Figure 2:
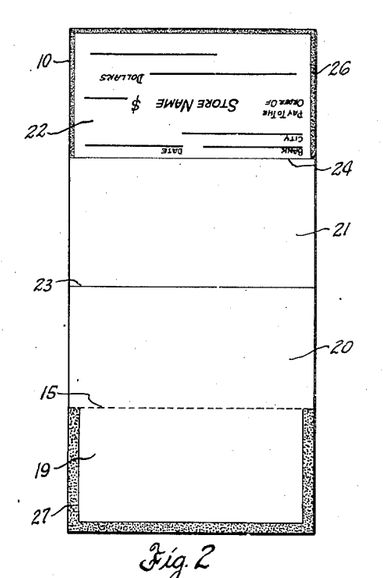
Figure 2 is a similar view of the reverse side of the form.

Figure 2 illustrates the reverse side of the sheet 10. The reverse side or panel 19 of the statement body 12 is blank. If desired, the marginal portions 27 of the panel 19 may be coated with wax, grease, plastic, or any other suitable material which is repellant to adhesives. The nature and purpose of such coating will be more fully described hereinafter. This panel 19 may also be inscribed with instructions, directions or advertising matter if desired.

Figure 3:
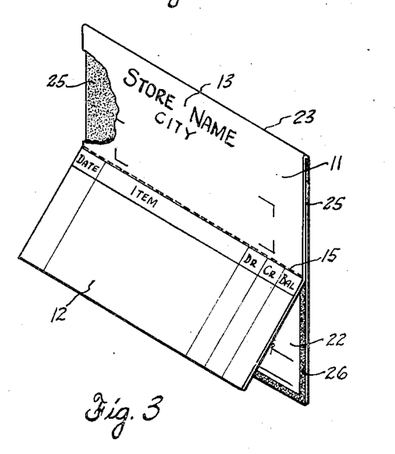
Figure 3 is an isometric view of the form showing the same folded for use as an accounting form.
Figure 4:
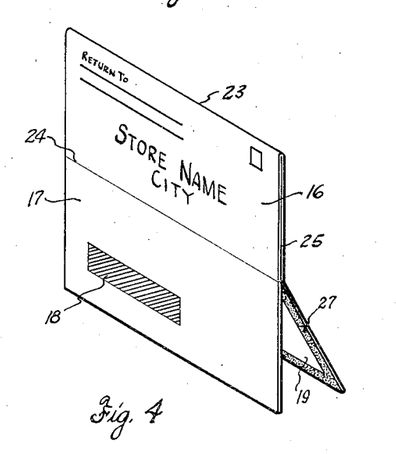
Figure 4 is a similar view of the reverse side of the form.

A blank panel or section 20 on the reverse side of the statement heading 11 is superjacent to the panel 19. As illustrated, Figure 3, glue or other adhesive may be applied to it in spots, lines, or over its entire area. A blank panel 21 on the reverse side of the return address panel 16 is superjacent to the panel or section 20, and it may have adhesive applied to it in the same manner as on panel 20. In certain embodiments of the invention, hereinafter described, neither panel 20 nor panel 21 would have adhesive applied thereto.

A blank check panel 22 is imprinted at the opposite end of the form from the panel 19 and on the reverse side of panel 17. The position of the printing of the blank check form will ordinarily be inverted with relation to the printing of the statement heading 11, as is clearly illustrated in Figures 1 and 2.

As shown in Figures 3 to 6, inclusive, sheet 10 is folded at 23 between the statement heading 11 and return address panel 16. This causes panels 16 and 17 to lie behind or under the heading 11 and the statement body 12. It is noted that after such folding the heading panel 11 and the return address panel 16 are back-to-back and therefore each faces outward. The same applies to panels 12 and 17. The reverse or blank sides 20 and 21 of panels 11 and 16 may be imprinted in various ways, or lined with suitable material, so as to increase the opacity of the paper. As has been explained, the blank panels 20 and 21 may be joined or cemented together as at 25 with glue or other material, it being understood that such cementing may cover the entire contiguous area of the panels or may be in spots or lines, or may be accomplished by a sheet of self-sealing or other lining or cementing compound, or said panels may be joined together by crimping or by other suitable means. Experiments show that statement forms of such a double thickness and weight are more rigid and easier to handle in file trays and books, and are easier to insert into bookkeeping machines, especially where such top panels 20 and 21 are glued or cemented together.

While sheet 10 is illustrated as being perforated only on the transverse line 15 between the statement heading and body panels 11 and 12, it is understood that a similar perforated line may also be provided at 24 between the panels 21 and 22. The purpose of the perforated line at 15 is to permit ready detachment of the statement body and a perforated line at 24 would facilitate the folding at that point by the debtor, as explained hereinafter, and would also provide for easy detachment of the check from the remainder of the form, if desired.

Since the blank check form 22 is on the reverse side of the blank panel 17, a block of printed matter 18, such as an endorsement or advertising, a scroll, solid block or other overprinting, may be provided on panel 17 to render the signature area of the check form opaque or less transparent and reduce the possibility of unauthorized or undesired reading, or tracing of the signature.

In use, the form is substantially flat, with the appearance of a standard statement form, and may be handled in the customary manner. Since there are no unusual flaps or extensions, the form may be readily used with standard office and accounting machinery and equipment and lends itself readily to all accounting handling, systems and practices.

After the necessary entries have been made and the statement form is ready to be sent to the debtor, it may be folded along the perforated line 15 in the usual manner and inserted in a window or other type envelope for mailing.

Figures 5, 6, 7, 8:
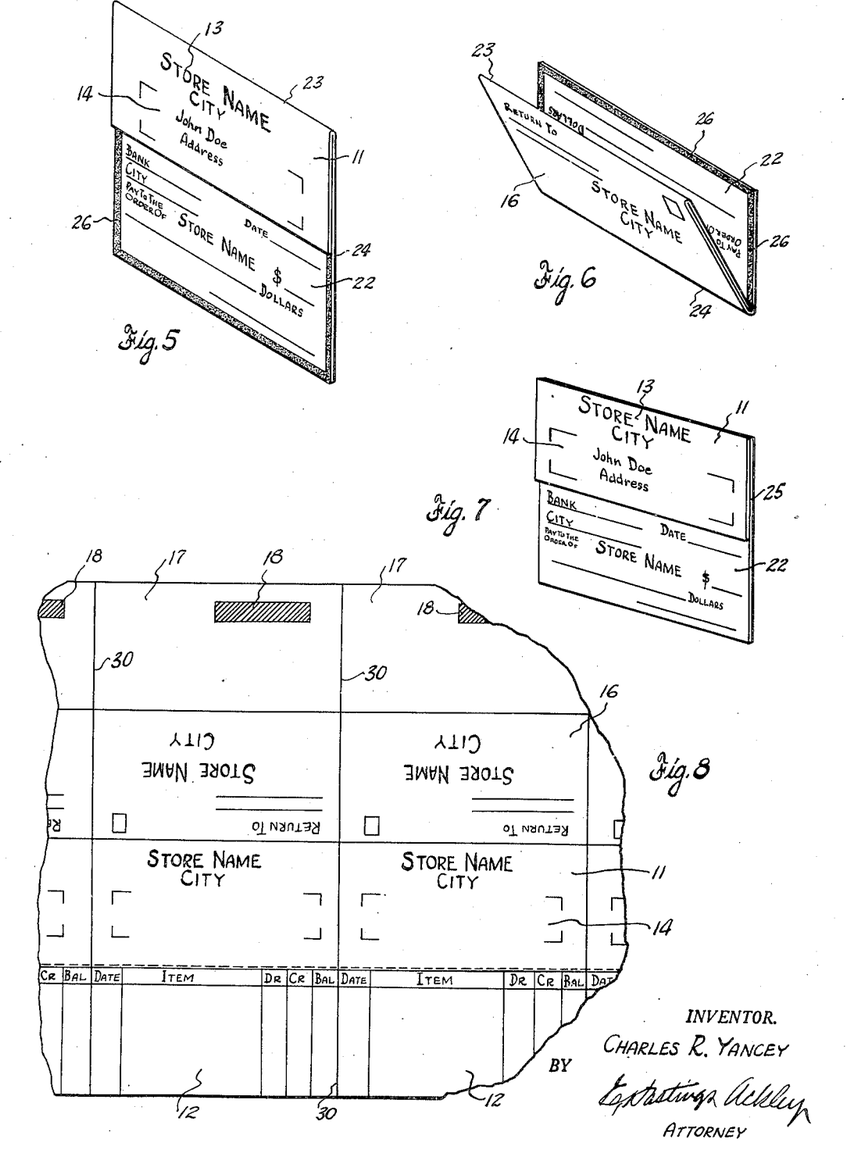
Figure 5 is an isometric view of the form showing the statement body removed.
Figure 6 is an isometric view of the form showing the same being folded into an envelope.
Figure 7 is an isometric view of the form after the return envelope has been opened.
Figure 8 is a plan view of a slightly altered arrangement of the form showing the same being imprinted upon a continuous sheet of paper.

Figure 5 shows the heading or credit stub 11 with the check blank 22 exposed, after the statement body 12 has been removed by tearing or cutting along the perforated line 15. It is readily apparent that the check panel may be easily folded at transverse line 24 over the heading 11, as shown in Figure 6, to form an envelope concealing the check and statement heading.

The lower and side marginal portions of the check panel 22 have a line of glue or other adhesive 26 thereon. Instead of a line, the glue or adhesive may be applied in spots or areas along the marginal portions of the check. The glue or adhesive is so applied and located that when the check panel 22 is folded over the heading panel 11, as in Figure 6, the two panels may be marginally cemented face-to-face so as to prevent the written matter on the panels 11 and 22 from being distinguishable without tearing open the envelope which is produced by such folding and cementing. It is, of course, understood that the glue or cement may be of various types including self-sealing. As has already been described, the marginal portions 27 of the blank panel 19 on the reverse side of the statement body may be coated with wax or other suitable adhesive repellant material normally positioned to be in juxtaposition to the glue or adhesive 26 on the check panel 22. This waxed area permits use of a self-sealing adhesive on the check form.

The position and arrangement of the adhesive means 26 is important. Obviously, in a statement or bill form of this type it would be impractical to provide adhesive areas which would be exposed to perspiration from the bookkeeper's hands, humidity or other moisture during the frequent handling and posting which such forms receive throughout the accounting period. Such accidental moistening would cause the glue to adhere to other objects and, at the least, moistening the glue would tend to lessen its adhesive quality. Attention is therefore called to the fact that none of the glue areas in this business form is exposed to such accidental wetting or deteriorating influences. All glue areas are fully covered and protected until deliberately exposed by removal of the statement body 12 for completion of the check 22 and formation of the return envelope as described hereinbefore.

It is again pointed out that this statement form has neither awkward lateral flaps, extensions, indentations; nor any thickness greater than two sheets of paper. A form having any of these undesirable features might snag in some part of the bookkeeping or addressing machinery, cause difficulty of insertion or removal, or might interfere with the making of necessary carbon copies. Also, due to its regular or standard size and shape, the handling and filing of the form here described may be accomplished without any change or adjustment whatsoever in present bookkeeping machinery and storage books, trays, or other files.

Figure 6 illustrates the manner in which the customer or other debtor folds the form into an envelope, after the check 22 has been completed. The fold is made along a transverse line 24 so that the statement heading and check panels 11 and 22 are brought face-to-face in alignment with each other, as described hereinabove, and are sealed together by moistening the adhesive 26. This conceals the check form and the statement heading and exposes only the return address panel 16, thus forming a return self-addressed envelope.

Particular attention is called to the envelope which is produced under this invention. After the statement body 12 has been removed, only the moistening of glue area 26 and the folding of check 22 over the heading 11 is required to produce a completely sealed envelope. Only one fold is required. There are no flaps to be folded, nor are other insertions necessary. The double thickness provided by the cemented panels 20 and 21 gives the resultant envelope substance and rigidity, while the imprinting of such panels and of block 18 may be so complete as to make the writing and printing on the check and heading undecipherable.

Further, it is emphasized that the statement heading or credit stub 11 and the check 22 are positioned and printed so as to prevent any portion of the written matter on such panels from being damaged or obliterated by the glue areas 26. In use, after the check form has been completed by the debtor and mailed to the creditor, the glued or cemented marginal portions of the check form and statement heading are cut or sheared off to permit opening or unfolding of the heading and check form as shown in Figure 7. The fixed and known relative positions of such check and credit stub with respect to the outside edges of the envelope, the uniform size of the envelopes and the absence of pins, clips, or inserted matter make possible the removal of the cemented margins by suitable automatic high speed opening and unfolding machinery. Such rapid and quantity opening processes may be performed with absolute safety from damage to the check or credit stub; whereas, under present practice, checks received in envelopes are frequently mutilated when the envelopes are opened, despite all efforts to sort out the various sizes and to "knock-down" their contents.

Figures 9, 10:
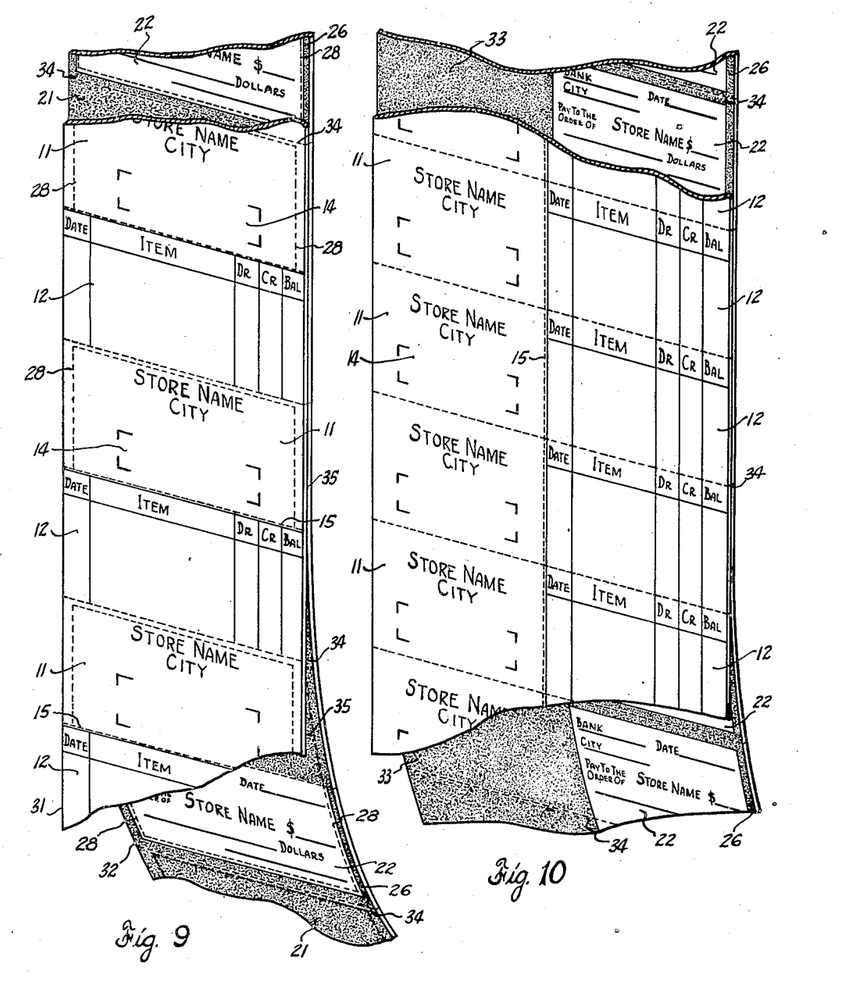
Figure 9 is a view, partly in elevation and partly in section, illustrating a modified form of the invention.
Figure 10 is a similar view illustrating still another arrangement of the business form of this invention.

Obviously, the blank check and statement heading and return address panels may be perforated substantially as at 28, Figure 9, to provide for the removal of the cemented marginal portions thereof.

Figure 7 illustrates the statement heading or credit stub 11 with the check 22 attached, after the envelope has been opened by removal of cemented portions 26 and unfolded. It is to be noted that the credit stub with all information needed for identification and application of the remittance is in an open, readable and fixed position relative to the check so that no pins, clips, staples, or other fastening devices are required to hold the two items together, and that the complete information borne on both the stub and the check is in full view, in one plane, for facile examination of every detail.

Moreover, the opening of the envelope and exposure of its contents is complete, as seen in Figure 7; whereas, in present practice, envelopes of conventional design must be carefully examined after being opened to be sure that no enclosure was left in the envelope by oversight.

After the check and credit stub have been properly examined, and notated or otherwise processed for entry against creditor's account, the two parts may be quickly separated in large quantities by cutting them with proper machinery, or by tearing along a transversely perforated line at 24 as hereinbefore mentioned.

In many cases, it may be important that the date of mailing the remittance by the debtor be established and preserved by the creditor. It is pointed out that the postmark is preserved as imprinted upon the return address panel 16 on the reverse side of the statement heading or stub 11, thus forming a permanent record of such date in the creditor's files.

It is possible that in some cases the joinder or cementing of panels 20 and 21 may be undesirable. This would especially be true where it is sought to make it possible for the debtor to retain the heading panel 11 as well as statement body 12.

In such cases, a duplicate copy of the heading may be imprinted on panel 21 and the debtor's name and address may be impressed upon such panel 21 by carbon process or otherwise at the same time they are imprinted upon the panel 11. A perforated line would then be provided at 28, providing for easy detachment of panels 21 and 22 from panels 11 and 12. The check panel 22 in this modification of the form would be folded at 23 over panel 21 (rather than over panel 11 as in the preferred form) to produce the same general type of return envelope as that previously described. All other advantages of the combination form are retained in this modification.

Obviously, the form may be imprinted upon a continuous elongate sheet of paper as illustrated in Figure 8, and cut into individual sheets along the lines 30 to provide separate forms. Such processing is readily adaptable to rotary printing, perforating, gluing and folding methods and thus reduces the cost of manufacture of the forms and speeds their output.

Figures 1 and 2 show the combined statement, blank check, and return envelope form as being printed and otherwise made up of only one sheet of paper, such sheet being folded at 23 so that the panels 16 and 17, and their reverse sides 21 and 22 respectively, lie under or behind panels 11 and 12.

It is pointed out, however, that the portion of the form comprised of the panels 16 and 17, with their reverse sides 21 and 22, may be printed upon a separate sheet of paper as in Figure 9. If the form of the invention is manufactured in this manner, there would be no change in the position or function of the respective panels from the position or function of the panels of the single-sheet form. The principal difference is that the fold at 23 in Figures 3 to 6 inclusive would not be present in the double-sheet form. Otherwise, Figures 3 to 6 inclusive illustrate the double-sheet form as well as the single-sheet form in every respect.

As clearly illustrated in Figure 9, a continuous sheet of paper 31 has imprinted thereon the statement heading panel 11 and statement body panel 12 in the same format, as has already been described. A second continuous sheet of paper 32 has imprinted on it the return address panel 16 and the blank check panel 22, in the same relative positions as those panels have been described as being located in the preferred form.

The continuous sheets are then positioned with the statement heading panel 11 overlying the blank reverse side, or panel 21, of the return address panel 16, and with the statement body panel 12 overlying the blank check panel 22. The contiguous reverse sides 20 and 21 of the statement heading and return address panels respectively may be glued or cemented together at 35 in the same manner as has already been described.

Thus, it will be seen that a continuous strip containing a plurality of forms ready for use may be produced in this manner. If desired, the continuous strip of forms may be perforated at 34 to provide for detachment of individual complete combination statement, blank check and return address forms from the strip.

The strip of complete forms may be rolled or folded flat for convenience in handling.

Obviously, the form may be printed in the make-up illustrated in Figure 10, wherein the statement heading and body panels or sections are printed transversely on an elongate continuous sheet rather than longitudinally thereon. In such case, the statement heading and return address panels are glued or cemented back-to-back at 33 and the statement body covers the check form in the same manner as has already been described. It is further pointed out that the principal difference between the form illustrated in Figure 10 and the preferred form of the invention is the location of the statement body panel and the blank check panel. In this modification the statement body and check are positioned to one side of the heading panel and return address panel respectively. In other respects the form is substantially identical to the forms shown in Figures 3 through 7 and in Figure 9.

A modified form of the combination statement, blank check, and return envelope form is illustrated in Figures 11 through 16.

The principal advantage of this modified form is that only one thickness of paper is provided at the statement body so that additional carbon copies may be made.

A rectangular sheet of paper 40 or other suitable material is printed, perforated, folded and cut substantially as shown and hereinafter described.

Figure 11:
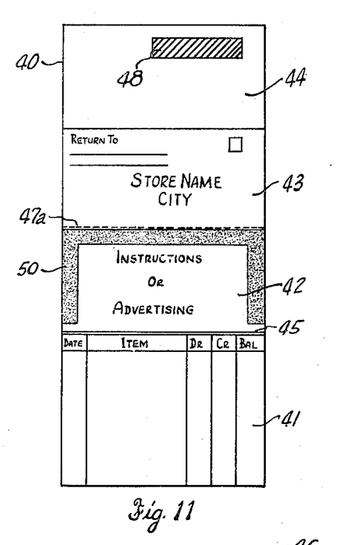
Figure 11 is a plan view of one side of still another form of the invention.

As shown in Figure 11, the sheet 40 has printed on one surface thereof a statement body 41 at one end of said sheet, and a panel 42 superjacent to said statement body may have imprinted thereon directions or advertising. A return address panel 43 is imprinted superjacent to panel 42. The panel 44 at the opposite end of sheet 40 may be blank or may bear a printed area 48 for purposes described hereinafter.

Figure 12:
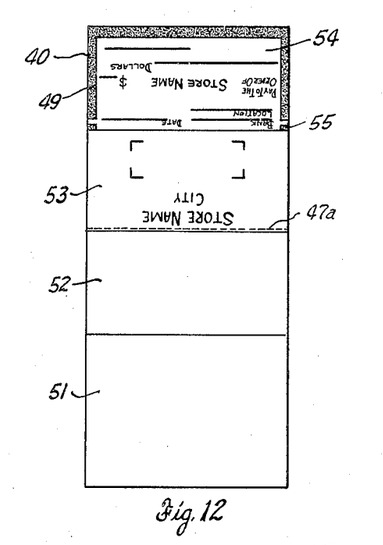
Figure 12 is a similar view of the reverse side of the same.

Figure 12 illustrates the reverse surface of sheet 40. A blank panel 51 is the reverse side of the statement body 41, and a blank panel 52 is superjacent to said panel 51 and is the reverse side of panel 42. Both panels 51 and 52 are shown to be blank but may be printed with advertising or the like, if desired. Panel 53 is imprinted with a statement heading of the type hereinbefore described. Panel 54 is imprinted with a blank check form. The printing on both the statement heading 53 and the check 54 is preferably inverted with respect to the printing of the statement body 41.

Figures 13, 15:
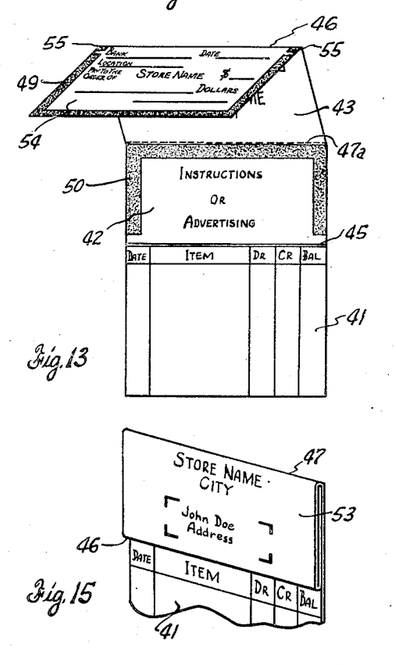
Figure 13 is a view showing one step in folding the form for use.
Figure 15 is a fragmentary view illustrating the form completely folded for use.
Figure 14:
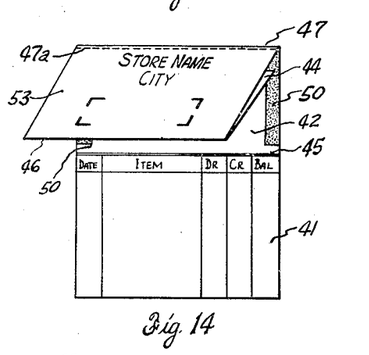
Figure 14 is a similar view showing the second step in folding the form.

To complete formation of the combination form, the sheet 40 is first folded at 46 between the blank check form panel 54 and the return address panel 43, as illustrated in Figure 13, so that the panel 44 lies contiguous to the return address panel 43. The sheet is then folded at 47, as shown in Figure 14, to position the check panel 54 contiguous to the directions panel 42. The folded panels are then pressed flat, as shown in Figure 15, into position for use. Perforations are provided at 47a for permitting detachment of the statement body 41 and directions panel 42 from the remainder of the form as will be hereinafter set forth. Glue or adhesive spots 55, at the corners of the blank check panel 54 near the fold 46, may be used to maintain the form in the folded position. Manifestly, there may be additional or other glue spots or areas provided for holding the form folded and they may be located on either the check form panel or the directions panel 42 or both.

Adhesive or glue areas, spots or lines 49 may be provided on the marginal portions of the blank check panel 54, and they may be located or composed in the same manner as the glue or adhesive areas 26 of the form already described. Also, adhesive repellant areas, spots or lines 50 may be provided on the directions panel 42 to permit use of self-sealing adhesive on the check form panel.

Figure 16:
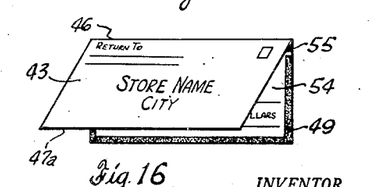
Figure 16 is a view showing the return envelope and check of the modified form being folded for use.

In use, the statement heading and body portions of the form are completed and entries made in the usual manner. The form may then be folded along the line 45 and inserted in a window envelope for mailing to the customer or debtor. Upon receipt by the debtor, the statement heading and check panel are lifted after breaking loose the seal glue spots 55 and the statement body and direction panel 42 are detached by tearing along the perforations at 47a. The blank check form may then be filled in and folded face-to-face with the statement heading form, as illustrated in Figure 16, to form an envelope. Moistening the glue areas 49 permits sealing the edges of the two panels together to enclose completely and conceal the check form and statement heading. A printed area 48 may be provided on the panel 44 for obscuring the signature area of the check.

For practical purposes the envelope thus formed is identical in substantially all respects with the envelope of the form first described and may be handled in the same manner by the creditor upon its return. The opening of the envelope is accomplished by the same means and in the same manner, and, after such opening and unfolding, the appearance of the heading 53 and check 54 is substantially the same as that of the first form.

The above description of the invention is explanatory only, and changes in the details of the constructions illustrated may be made by those skilled in the art, within the scope of the appended claims, without departing from the spirit of the invention.

What I claim and desire to secure by Letters Patent is:

1. A business form including, a statement heading section and body section, a blank check section carried by said statement heading section and underlying the statement body section, means providing for detachment of the statement body section from the statement heading section, said check section being arranged to be folded with relation to the statement heading section after the body section has been detached to form an envelope, and a preimpressed return address section carried on the reverse side of the statement heading.

2. In a business form, an elongate sheet folded at its middle portion so as to result in one portion overlying the other portion, a statement heading section and body section imprinted upon the exposed surface of one portion, a blank check form imprinted upon the other portion upon a section underlying the statement body section of the one portion so as to be normally concealed thereby, a return address preimpressed upon a section of the exposed surface of the said other portion underlying the statement heading section, and means providing for detachment of the statement section of the form whereby the check section may be folded with relation to the return address section to form an envelope concealing the check section.

3. A business form including, juxtaposed sheets one overlying the other, a statement body and heading section on the overlying sheet, a blank check form on a section of the underlying sheet positioned under the statement body, means providing for detachment of the statement body of the overlying sheet, said underlying sheet being arranged to be folded to enclose the check form in an envelope, and a return address imprinted upon an exposed portion of the envelope other than the check form portion.

4. A business form including, a first sheet having imprinted thereon a statement heading and statement body, perforations in the sheet between the heading and body providing for detachment of the body from the heading, a sheet underlying the first sheet and having imprinted upon a portion thereof underlying the statement body of the first sheet a blank check form, said check form being normally covered by said statement body, a return address section imprinted upon the reverse side of said underlying sheet upon the portion thereof positioned under the statement heading, said check portion of the underlying sheet being arranged to be folded together with the return address section to form an envelope concealing the check form and the statement heading and leaving the return address section exposed, and adhesive means for sealing the envelope closed.

5. A business form including, an elongate sheet of paper, a statement heading portion imprinted thereon, a statement body portion imprinted thereon adjacent to the heading portion, a return address portion imprinted upon said sheet adjacent to the statement heading, a blank check form portion imprinted upon said sheet adjacent to said return address portion, said sheet normally being folded with the statement heading and statement body portions exposed and with the check portion covered, means providing for detaching the statement body portion, means providing for folding the check portion and return address portion together to form an envelope concealing said check portion and leaving the return address portion exposed, and means for sealing the envelope closed.

6. In a business form, a combination statement and check and return envelope form including: a statement heading panel; a statement body panel section carried by the heading panel, said body section being detachable from the heading panel; a return address panel carried by the heading panel; and a check panel carried by the heading panel and normally covered by one of the other panels so as to be concealed from view; said check panel, return address panel and heading panel being arranged to be folded and sealed to form an envelope concealing the statement heading and check panels and with the return address panel exposed.

7. In a business form, a combination statement, check and return envelope form including: a statement heading panel, a statement body panel section associated with and normally adjacent the heading panel, a return address panel associated with the heading panel, and a check panel associated with the heading panel and normally covered by one of the other panels; said statement heading panel, return address panel and check panel being arranged to be folded to form an envelope concealing the statement heading and check panels and with the return address panel exposed, and adhesive means on one of the enclosed panels for sealing the envelope closed, said adhesive means being normally covered by one of the panels prior to its use for sealing the envelope closed.

8. A business form including, an elongate sheet having imprinted thereon a plurality of statement forms each including a statement heading panel and a statement body panel portion; a second elongate sheet having imprinted thereon a plurality of blank check forms and return address panels, said second sheet underlying the first sheet; means joining respective return address panels and statement heading panels back-to-back; adhesive means on the marginal areas of the blank check forms underlying and normally covered by the statement body portion of the first sheet; said joined statement forms and check and return address panels forming a plurality of combination forms each separable from the remainder of the elongate joined sheets; and means providing for detachment of the statement body panel of each combination form from the balance thereof; said heading panel, check form and return address panel being arranged to be folded to form an envelope concealing the statement heading and check and with the return address panel exposed; the adhesive means on the check form being used for sealing said envelope closed.

9. A business form including, juxtaposed sheets one overlying the other, a statement form including a statement heading and a statement body imprinted on the overlying sheet, a blank check form imprinted on a section of the underlying sheet and positioned under the statement body so as to be normally covered thereby, a marginal adhesive area on the check form also normally covered by said statement body, means providing for detachment of the statement body of the overlying sheet to expose the check form, said underlying sheet being arranged to be folded to provide an envelope enclosing the check form, said adhesive area being used to seal the envelope closed, and a return address imprinted upon an exposed portion of the envelope other than the check form portion.

10. A business form including, juxtaposed sheets one overlying the other, a statement form having a heading portion and a body portion imprinted on the overlying sheet, a blank check form imprinted on a section of the underlying sheet and positioned under the statement body so as to be normally covered thereby, means providing for detachment of the statement body, said underlying sheet being arranged to be folded with relation to the statement heading to form an envelope inclosing the check form, marginal adhesive areas for sealing the envelope closed and normally covered to protect the same, and a return address imprinted on the exposed portion of the underlying sheet adjacent to the statement heading.

11. A business form including, an elongate sheet of paper, a statement body portion imprinted thereon, a statement heading portion also imprinted thereon, a blank check form imprinted upon the sheet adjacent the statement heading, a return address panel imprinted upon the sheet on the reverse side of the statement heading, said check form being folded under the statement heading and said check form and heading being folded to position the heading adjacent the statement body to provide a statement form, means providing for detachment of the statement heading and blank check from the balance of the sheet, said check form and statement heading being arranged to be folded together to form an envelope enclosing the check and heading and leaving the return address panel exposed, and adhesive means on one of the enclosed portions for sealing the envelope closed, said adhesive means being normally covered by one of the portions of the sheet.

12. A business form including a statement heading panel, a statement body panel detachably carried by the heading panel, a return address panel joined back-to-back to the statement heading panel, a blank check form carried by the return address panel and normally covered by the statement body panel so as to be concealed thereby, an adhesive area on the marginal portion of the check form and also covered by the statement body, said check form being arranged to be folded together with the statement heading after detachment of the statement body portion to form an envelope enclosing the check and statement heading and leaving the return address panel exposed, said adhesive areas on the check form being used to seal the envelope closed.

13. A business form including, juxtaposed sheet portions one overlying the other, a statement form including a statement heading and a statement body imprinted upon the overlying sheet portion, a duplicate statement heading imprinted upon a section of the underlying sheet portion positioned under the heading on the overlying sheet portion, a return address panel imprinted upon the reverse side of the duplicate heading, a blank check form imprinted upon a section of the underlying sheet portion positioned under the statement body so as to be normally covered thereby, means providing for detachment of the check form and duplicate statement heading from the balance of the form, said check form and duplicate heading being arranged to be folded to form an envelope enclosing the check and duplicate heading and with the return address panel exposed, and adhesive means on the underlying sheet portion for sealing the envelope closed, said adhesive means being normally covered and protected by the overlying sheet portion.

14. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted on the reverse side of the section of the underlying sheet portion positioned under the heading, a blank check form imprinted upon a section of the underlying sheet portion positioned under the statement body and normally covered thereby, means providing for detachment of the statement body from the balance of the form, said check form being arranged to be folded over the statement heading to form an envelope covering the check and heading and leaving the return address exposed, and adhesive means for sealing the envelope closed.

15. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted upon the reverse of said rigid panel, a blank check form imprinted upon a section of the underlying sheet portion positioned under the statement body section of the overlying sheet portion, an adhesive area on the marginal portion of the check form, said overlying statement body section normally covering and protecting the check form and the adhesive area thereon, and perforations providing for detachment of the statement body section from the remainder of the form, said check form being adapted to be folded over the statement heading on the rigid panel to form an envelope covering the check and heading, the adhesive area on the check being adapted to seal the marginal portion of the check form and statement heading together to close the envelope.

16. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted upon the reverse of said rigid panel, a blank check form imprinted upon a section of the underlying sheet portion positioned under the statement body section of the overlying sheet portion, an adhesive area on the marginal portion of the check form, said overlying statement body section normally covering and protecting the check form and the adhesive area thereon, and perforations providing for detachment of the statement body section from the remainder of the form, said check form being adapted to be folded over the statement heading on the rigid panel to form an envelope covering the check and heading, the adhesive area on the check being adapted to seal the marginal portion of the check form and statement heading together to close the envelope, said check form and statement heading being arranged to have the sealed marginal portion removed to permit opening the envelope and unfolding the heading and check.

17. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted upon the reverse of said rigid panel, a blank check form imprinted upon a section of the underlying sheet portion positioned under the statement body section of the overlying sheet portion, an adhesive area on the marginal portion of the check form, said overlying statement body section normally covering and protecting the check form and the adhesive area thereon, perforations providing for detachment of the statement body section from the remainder of the form, said check form being adapted to be folded over the statement heading on the rigid panel to form an envelope covering the check and heading, the adhesive area on the check being adapted to seal the marginal portion of the check form and statement heading together to close the envelope, and means on the check form and statement heading providing for detachment of the sealed marginal portion to permit opening the envelope and unfolding the heading and check.

18. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted upon the reverse of said rigid panel, a blank check form imprinted upon a section of the underlying sheet portion positioned under the statement body section of the overlying sheet portion, an adhesive area on the marginal portion of the check form, said overlying statement body section normally covering and protecting the check form and the adhesive area thereon, perforations providing for detachment of the statement body section from the remainder of the form, said check form being adapted to be folded over the statement heading on the rigid panel to form an envelope covering the check and heading, the adhesive area on the check being adapted to seal the marginal portion of the check form and statement heading together to close the envelope, and means on the check form and statement heading providing for detachment of the sealed marginal portion to permit opening the envelope and unfolding the heading and check, said check form being detachable from the statement heading.

19. In a business form, a combination statement, check and return envelope form including; a statement heading panel, a statement body panel adjacent the heading panel, a return address panel adjacent the heading panel, and a check panel normally covered by one of the other panels; said statement heading panel, return address panel and check panel being arranged to be folded to form an envelope concealing the statement heading and check panels and with the return address panel exposed; and adhesive means on one of the enclosed panels for sealing the envelope closed, said adhesive means being normally covered by one of the panels prior to its use for sealing the envelope closed; and means on the check panel and statement heading panel providing for detachment of the sealed portion of the envelope to permit opening the same.

20. In a business form, a combination statement, check and return envelope form including: a statement heading panel, a statement body panel carried by and adjacent the heading panel, a return address panel adjacent the heading panel, and a check panel associated with and normally covered by one of the other panels; said statement heading panel, return address panel and check panel being arranged to be folded to form an envelope concealing the statement heading and check panels and with the return address panel exposed; adhesive means on one of the enclosed panels for sealing the envelope closed, said adhesive means being normally covered by one of the panels prior to its use for sealing the envelope closed; and means for obscuring the matter contained in the envelope to prevent such matter from being readable through the envelope.

21. In a business form, a combination statement, check and return envelope form including; a statement heading panel, a statement body panel carried by and adjacent the heading panel, a return address panel adjacent the heading panel, and a check panel associated with and normally covered by one of the other panels; said statement heading panel, return address panel and check panel being arranged to be folded to form an envelope concealing the statement heading and check panels and with the return address panel exposed, and adhesive means on one of the enclosed panels for sealing the envelope closed, said adhesive means being normally covered by one of the panels prior to its use for sealing the envelope closed, said check panel and statement heading panel being arranged to have the sealed portion thereof removed to permit opening the envelope and unfolding the heading and check.

22. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted upon the reverse of said rigid panel, a blank check form imprinted upon a section of the underlying sheet portion positioned under the statement body section of the overlying sheet portion, an adhesive area on the marginal portion of the check form, said overlying statement body section normally covering and protecting the check form and adhesive area thereon, adhesive repellant means on the reverse side of the statement body to prevent premature adhesion of the adhesive area on the check, and perforations providing for detachment of the statement body section from the remainder of the form, said check form being adapted to be folded over the statement heading on the rigid panel to form an envelope covering the check and heading, the adhesive area on the check being adapted to seal the marginal portion of the check form and statement heading together to close the envelope.

23. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted upon the reverse of said rigid panel, a blank check form imprinted upon a section of the underlying sheet portion positioned under the statement body section of the overlying sheet portion, an adhesive area on the marginal portion of the check form, said overlying statement body section normally covering and protecting the check form and the adhesive area thereon, perforations providing for detachment of the statement body section from the remainder of the form, said check form being adapted to be folded over the statement heading on the rigid panel to form an envelope covering the check and heading, the adhesive area on the check being adapted to seal the marginal portion of the check form and statement heading together to close the envelope, and perforations on the check form and statement heading providing for detachment of the sealed marginal portion to permit opening the envelope and unfolding the heading and check.

24. A business form including, juxtaposed sheet portions one overlying the other, a statement form having a heading section and a body section imprinted upon the overlying sheet portion, the section of the underlying sheet portion positioned under the statement heading being cemented to the back of the heading to provide a substantially rigid panel, a return address imprinted upon the reverse of said rigid panel, a blank check form imprinted upon a section of the underlying sheet portion positioned under the statement body section of the overlying sheet portion, an adhesive area on the marginal portion of the check form, said overlying statement body section normally covering and protecting the check form and the adhesive area thereon, perforations providing for detachment of the statement body section from the remainder of the form, said check form being adapted to be folded over the statement heading on the rigid panel to form an envelope covering the check and heading, the adhesive area on the check being adapted to seal the marginal portion of the check form and statement heading together to close the envelope, perforations on the check form and statement heading providing for detachment of the sealed marginal portion to permit opening the envelope and unfolding the heading and check, and perforations providing for detachment of the check form from the statement heading.

25. In a business form, a combination statement, check and return envelope form including; a statement heading panel, a statement body panel associated with and normally adjacent the heading panel, a return address panel associated with the heading panel, and a check panel associated with the heading panel and normally covered by one of the other panels; said statement heading panel, return address panel and check panel being arranged to be folded to form an envelope concealing the statement heading and check panels and with the return address panel exposed, and adhesive means on one of the enclosed panels for sealing the envelope closed, said adhesive means being normally covered by one of the panels prior to its use for sealing the envelope closed, said check panel and statement heading panel being arranged to have the sealed portion thereof removed to permit opening the envelope and unfolding the heading and check, the position of the statement heading and check panels being such that when unfolded both said heading and said check are exposed to view.

CHARLES R. YANCEY.